Nov. 8, 1932.  P. L. TENNEY  1,886,850
SYNCHRONIZING TRANSMISSION
Original Filed July 17, 1929  2 Sheets-Sheet 1

Inventor
Percy L. Tenney
By Blackmore, Spencer & Hinh
Attorneys

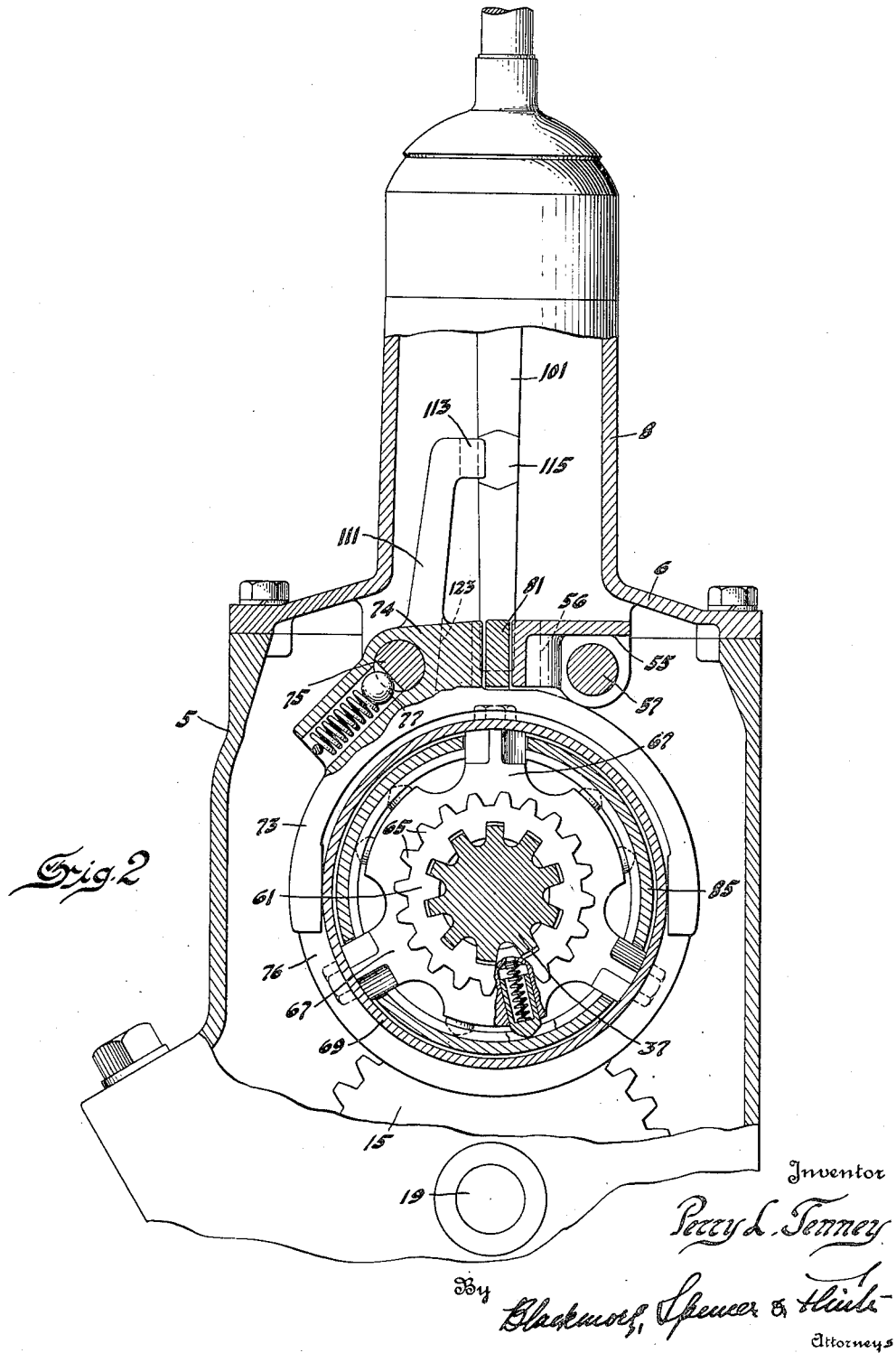

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

SYNCHRONIZING TRANSMISSION

Original application filed July 17, 1929, Serial No. 378,910. Divided and this application filed November 7, 1931. Serial No. 573,587.

This invention relates to selective variable speed power transmitting gear mechanism for motor vehicles in which means are utilized for bringing the intermeshable elements of high and intermediate speed trains to equal rates of speed before intermeshing, while low and reverse are selectively intermeshed in the usual manner.

This application is a division of application Serial No. 378,910, filed July 17, 1929 and is directed to a selective shift mechanism adapted to selectively intermesh high and intermediate synchronized trains with a greater mechanical advantage than is applied to intermesh non-synchronized low and reverse and with the same amplitude of movement of the power arm of a manual shift lever.

In the drawings,

Fig. 2 is a transverse section on line 2—2 of Fig. 1, and

Figure 1:
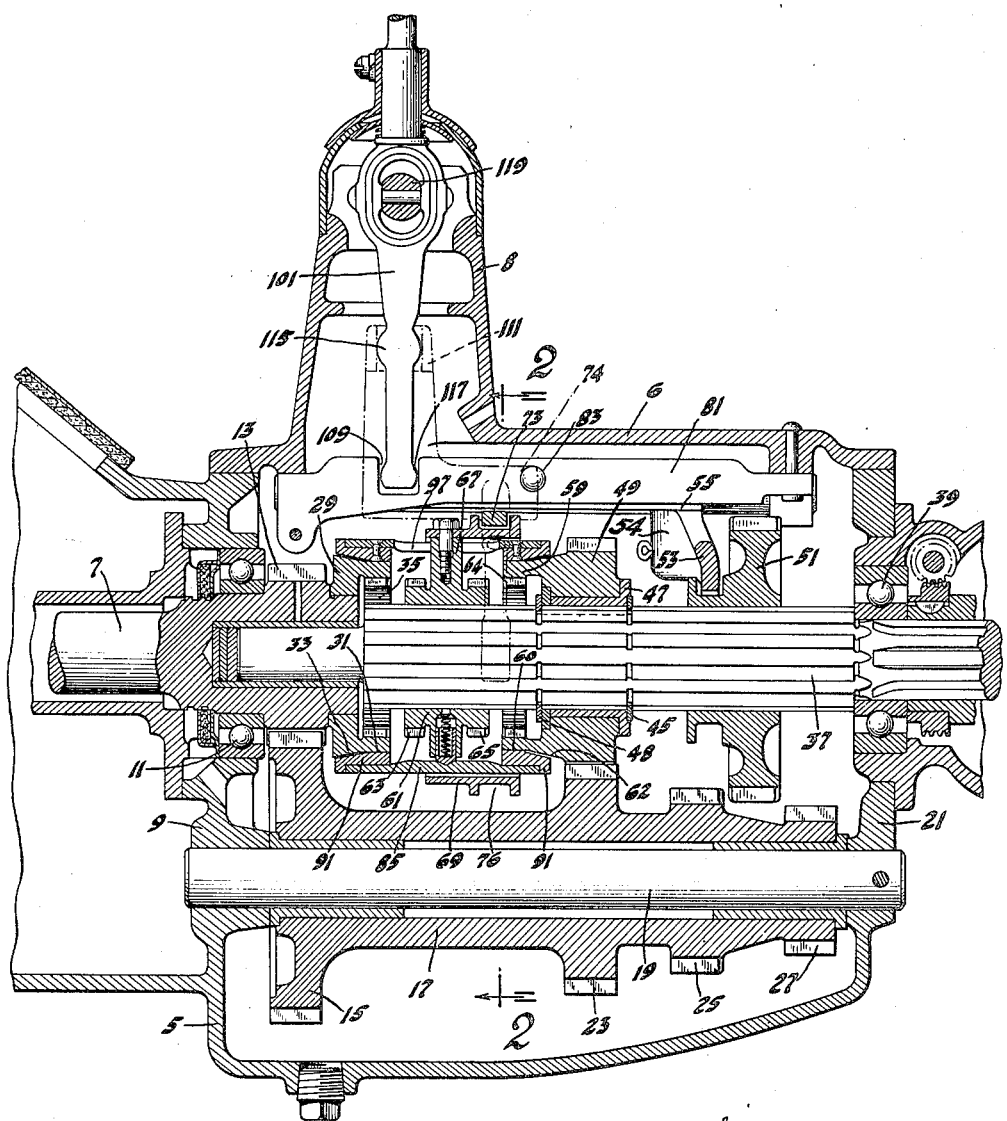
Fig. 1 is a longitudinal vertical section through a motor vehicle transmission mechanism embodying the invention.
Figure 3:
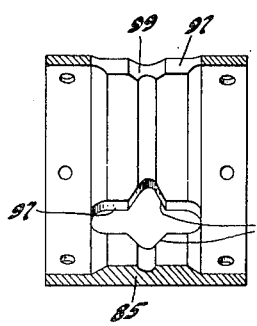
Fig. 3 is a longitudinal section through a friction clutch drum.

In the drawings, 5 indicates a gear box or casing enclosing the variable speed elements of the transmission mechanism and having a detachable cover plate 6 from which rises a hollow, shift-lever-fulcrum support and housing 8. A driving shaft 7, shown as the main clutch shaft of an automobile, has its rear end journaled in ball bearings 11 in front wall 9 of the gear box. A gear 13 rigid with the rear end of shaft 7 within the gear box is in constant mesh with gear 15 rigid with counter shaft 17 rotatable on a fixed shaft 19, the ends of which are supported in the front and rear walls 9 and 21 of the gear box. Also rigid with the counter shaft are intermediate speed train gear 23, low speed train gear 25 and reverse train gear 27, the latter intended to be in constant mesh with the usual reverse idler not shown.

Also rigid with drive shaft 7 is a cupped ring-shaped composite clutch element 29 equipped with internal gear-like clutch teeth 35 and an external conical friction clutch surface 33, merging into cylindrical surface 31, said clutch element adapted to cooperate with companion positive and friction clutch elements in torque transmitting relation to a driven shaft 37, shown as the usual spline shaft of a motor vehicle, said spline shaft having, as is usual, its front end reduced and piloted in a cylindrical bore drilled into the rear end of drive shaft 7, and its rearward end supported in ball bearing 39 in the rear wall of the gear box.

Intermediate-speed train spline-shaft gear 49 is journaled on bearing bushing 47 keyed to the spline shaft and prevented from moving axially thereon by fastening rings 45 and 48. The bushing 47 has a flange integral with it at the rear. Gear 49 is sleeved over said bushing, rearward movement being prevented by the rear flange thereon, while forward movement of said gear is prevented by a separate ring flange at the front disposed between fastening ring 48 and the front end of the bushing. Gear 49 is provided with external teeth in constant mesh with the teeth of counter shaft gear 23 and may rotate freely about the spline shaft when the transmission is in neutral as illustrated in Fig. 1. Gear 49, is formed with a forward extending annular part 59 formed internally with gear-like clutch teeth 64 and externally with a conical friction clutch surface 62 merging into the cylindrical surface 60. Thus gear 49 is provided with a composite friction and positive clutch element which corresponds in size and contour with, and faces the described composite clutch element 29 rigid with the drive shaft.

In order to selectively clutch spline shaft 37 to the drive shaft 7, to obtain high speed, or gear 49 to the spline shaft to obtain intermediate speed, the following elements are used:

A double ended tooth clutch element 61 is slidably splined to shaft 37 between the composite clutch element 29 on the drive shaft and the composite clutch element 59 integral with gear 49. External teeth 63 on one end of slidable clutch element 61 may be meshed with internal teeth 35 on companion clutch element 29 rigid with shaft 7 to establish direct high speed connections, and external teeth 65 on the other end of clutch element 61 may be meshed with internal clutch teeth 64 of companion clutch element 59 to establish intermediate speed connections.

Gear wheel 51 slidably keyed to shaft 37 may be slid forward to mesh its teeth with the teeth of gear 25 rigid with the counter shaft to establish low speed forward driving connection and may be slid rearward to mesh its teeth with gear 27 on the counter shaft to procure reverse drive.

The axial extent of movement of gear 51 in order to mesh fully with gear 25 or gear 27 is considerably greater than the axial extent of movement of slidable clutch element 61 to cause its teeth to interlock fully with companion clutch elements 29 and 59.

As more fully described in said parent application 378,910, in order to promote ease and quietness of speed changing, frictional devices are utilized for synchronizing the rotative speeds of shaft 37 and shaft 7 before intermeshing teeth 63 of sliding clutch element 61 on shaft 37 with the teeth of companion clutch element 29 on shaft 7; also for synchronizing the rotative speeds of shaft 37 and gear 49 before intermeshing teeth 65 of slidable clutch element 61 with teeth 64 of companion clutch element 59 on gear 49. The frictional synchronizing devices comprise the frictional elements already described as formed on composite clutch element 29 rigid with shaft 7 and like composite element 59 formed rigid with gear 49, having the externally conical surfaces 33 and 62 respectively, and the respective cylindrical bearing surfaces 31 and 60; and the double end companion friction element 85, consisting of a drum or barrel provided on the inside of its respective ends with similar friction shoes 91, each having an internal conical surface cooperating with the companion surface on the respective companion elements 29 and 59, and an internal cylindrical surface bearing upon the appropriate external cylindrical surface of the companion member, whereby drum or barrel 85 tends to center in neutral. The drum is provided with longitudinal slots 97 having laterally offset opposed V-shaped recesses 99 about midway of the slots. Radial arms 67 on the toothed clutch element 61 have inclined faces on their ends protruding into the slots 97. The ends of arms 67 are secured to shifter collar 69. Axial movement of the collar 69 moves the clutch element 61 toward one of its companions and thereby through the described connections between arms 67 and drum 85 causes the synchronizing devices to operate, and prevents interlocking of the clutch teeth until synchronization is brought about, all as specifically described and claimed in the application of which this is a division.

For selectively coupling the several trains of gearing there are provided two shifter slides 55 and 74 here illustrated as guided on parallel rods 57 and 75 fixed to the casing 5. Shifter slide 55, carries a yoke 53 arranged in engagement with a groove in a hub formed on gear 51, and couples low speed forward train when moved forward and reverse train when moved rearward. Shifter slide 74 is provided with a yoke 73 engaged in an external groove 76 in ring 69, and when said slide 74 is moved forward, high speed train is coupled and when moved rearward intermediate speed train is coupled. Between the two slides is disposed a locking rail 81 which is provided with an automatic interlocking device 83 of known type cooperating with the slides to lock one in neutral position during the operation of the other, and with a notch or gate 109 engageable by the lower end of the shift lever in neutral position in a known manner. Each slide carries a spring actuated latch 77 adapted to cooperate with notches in the rods on which they are guided, said latches serving to detain the slides in neutral and in coupling positions in a manner well understood. The latch that is associated with slide 74 is illustrated in Fig. 2. That associated with slide 55 is not shown but the casing for it is indicated at 54 Fig. 1.

To enable an operator to select and operate either shifter slide 55 or 74 at will, a shift lever 101 of the first order, generically of known type, is universally pivoted at 119 within the hollow support 8. The work arm of shift lever 101 is adapted to be selectively interlocked with either shifter slide 55 or shifter slide 74, by means of devices to be now described.

Shifter slide 55 has a notch 56 (indicated by dotted lines in Fig. 2) which in the neutral position is disposed in registration with notch or gate 109 in the fixed rail or rod 81. This notch 56, which is usual in sliding gear transmissions, is of a depth equal at least to the transverse thickness of the lower bearing terminus 117 of shift lever 101. Shifter slide 74 is provided with an arm 111 rigid therewith extending upward and terminating with a bifurcated member 113 directed toward the shift lever, the opening being in registration with the bearing formation 115, disposed between the fulcrum 119 and the terminus 117 on lever 101, before mentioned, when said terminus 117 is seated within the gate 109 as illustrated in the drawings. When the parts are in the neutral position illustrated terminus 117 projects slightly on each slide of the fixed rail 81 into notch 56 of shifter slide 55, and into a cut-away space 123 in slide 74, while the part 115 projects slightly into the opening in the forked portion 113 of arm 111. Under these conditions no fore and aft movement of shift lever can be made because the lower end of the shift lever is held by the gate in fixed rail 81.

In order to engage the low-speed-forward train the operator (sitting to the rear of the shift lever,—at the right as viewed in Fig. 1) seizes the upper end of the power arm of the shift lever and moves it to his left, thus moving the lower end of the lever to the right, fully engaging the terminus 117 on the work arm of the lever with the notch 56 in slide 55; then if the upper end of the lever is pulled rearward, thus moving the lower arm forward, gear 51 will be meshed with gear 25. A forward movement of the power arm of the shift lever now will cause gear 51 to disengage gear 25 and engage the reverse idler in mesh with gear 27, thus coupling the reverse train.

Starting again from neutral position shown in the drawings and moving the upper or power arm of the shift lever to the right the lower terminus 117 thereof moves out of the gate 109 and into the space 123 in slide 74, while intermediate part 115 enters fully into the space in fork 113. Now movement of the power arm of the shift lever forward will cause slide 74 to move rearward and shift clutch element 61 into engagement with companion clutch element 59 on gear 49 thus coupling intermediate speed train. Now moving the upper end of the shift lever rearward will cause clutch element 61 to slide forward, disengage gear 49 and engage clutch element 29, thus coupling the transmission in direct high speed.

The extent of movement necessary to couple high and intermediate trains is, as previously pointed out, less than that necessary to couple low speed and reverse trains and, as high and intermediate trains are synchronized by friction clutches prior to being positively coupled, a considerably greater force is necessary to obtain synchronization in the brief time available than to shift the sliding gear of the low speed and reverse train. In the operating mechanism illustrated the gear 51, in order to fully intermesh with one of its companion gears, has to travel from neutral about a distance of say one inch, while the clutch element 61 in order to interlock with one of its companions has to travel from neutral a distance of say one-half inch. The tip 117 and the intermediate part 115 of lever 101 travel in equal proportions (2:1) and the length of the work arm engaging slide 55 to the length of the work arm engaging slide 74 is also about 2:1. The power arm of the shift lever travels the same length of arc in making each shift. By application of the same muscular force acting through the same distance, therefore, twice the force is transmitted to the slide that shifts the synchronized coupling members, which need it, than that transmitted to shift the unsynchronized members which do not need it.

I claim:

1. In variable speed gear transmission mechanism, the combination of a low speed train devoid of synchronizing devices and a higher speed train associated with synchronizing devices, both trains including shiftable coupling elements; a shifter slide connected to the shiftable element of the low speed train, a shifter slide connected to the shiftable element of the higher speed train, said last named slide having an arm rigidly fixed thereto; a shift lever, means whereby the shift lever may be interlocked with said arm, and means whereby the shift lever may be interlocked with the shifter slide that is connected to the low speed train at a point further from the fulcrum of said shift lever than the point of connection of the latter with said arm.

2. In variable speed gear transmission mechanism, the combination of a low speed train devoid of synchronizing devices and a higher speed train associated with synchronizing devices, both trains including shiftable coupling elements; parallel guides, a shifter slide guided by one of said guides and connected to the shiftable element of the low speed train, a shifter slide guided by the other of said guides, and connected to the shiftable element of the higher speed train, said last named shifter slide having an arm rigidly fixed thereto; a shift lever of the first order, means whereby the extremity of the work arm of the shift lever may be interlocked with the shifter slide connected to the shiftable element of the low speed train, and means whereby the work arm of the shift lever may be interlocked with the arm of the slide connected to the higher speed train at a point between the extremity of said work arm and the fulcrum of the shift lever.

3. In variable speed transmission mechanism, the combination of low speed and reverse trains, and high and intermediate speed trains associated with synchronizing devices, both trains including shiftable coupling elements; a shifter slide connected to the shiftable element of the low and reverse trains, a shifter slide connected to the shiftable elements of the high and intermediate speed trains, parallel guides for said slides disposed equidistant from the axis of the shiftable elements, and an arm rigidly secured to and rising from said last named slide; a shift lever, means whereby the work arm of the shift lever may be interlocked with the shifter slide connected to the shiftable element of low and reverse trains, and means whereby the work arm of the shift lever may be interlocked with said arm rising from the shifter slide connected to the high and intermediate speed train, at a point nearer the fulcrum of the shift lever than the point of connection of said lever to the low and reverse train.

4. In variable speed transmission mechanism, the combination of parallel shafts equipped with a low speed train including slidably meshed gears, a higher speed train including interengageable frictional and positive clutch elements, a shifter slide connected to the slidable gear of the low speed train, a shifter slide connected to the movable clutch elements of the higher speed train and provided with a rigidly attached arm extending at an angle to its path of movement, said clutch elements having a shorter range of movement to and from engagement with their companion than the slidable gear of the low speed train; a shift lever of the first order, means whereby the extremity of the work arm of said lever may be interlocked with the shifter slide connected with the slidable gear of the low speed train and means whereby the work arm of said lever may be interlocked with said arm of the shifter slide connected to the movable clutch elements of the higher speed train at a point between the extremity of the work arm and the fulcrum of said lever.

In testimony whereof I affix my signature.

PERRY L. TENNEY.